US007808992B2

(12) United States Patent
Homchaudhuri et al.

(10) Patent No.: US 7,808,992 B2
(45) Date of Patent: Oct. 5, 2010

(54) PLATFORM INDEPENDENT IMPLEMENTATION OF PRIVATE VLANS

(75) Inventors: Sanjib Homchaudhuri, Fremont, CA (US); Senthil Arunacahalam, Fremont, CA (US); Sundher Narayanaswamy, San Jose, CA (US); Krishna Kumar Vavilala, Pleasanton, CA (US); Abhishek Gupta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 929 days.

(21) Appl. No.: 11/026,464

(22) Filed: Dec. 30, 2004

(65) Prior Publication Data
US 2006/0146835 A1 Jul. 6, 2006

(51) Int. Cl.
H04L 12/28 (2006.01)
H04L 12/56 (2006.01)

(52) U.S. Cl. .............. 370/392; 370/394; 370/401; 370/359

(58) Field of Classification Search ........... 370/389, 370/401, 464, 465, 235, 390, 396, 432, 230, 370/230.1, 236–238, 254, 351, 395.31, 395.54, 370/400, 392, 394, 358–360; 709/225, 218, 709/221, 249, 220
See application file for complete search history.

(56) References Cited
U.S. PATENT DOCUMENTS 5,394,402 A 2/1995 Ross
5,740,171 A 4/1998 Mazzola et al.
5,959,989 A * 9/1999 Gleeson et al. ............. 370/390
5,970,066 A * 10/1999 Lowry et al. ............... 370/353
6,208,649 B1 3/2001 Kloth
6,304,901 B1 10/2001 McCloghrie et al.
6,493,318 B1 * 12/2002 Bare ......................... 370/238
6,556,541 B1 * 4/2003 Bare ......................... 370/235
6,606,650 B2 * 8/2003 Hughes et al. ............. 709/213
6,741,592 B1 * 5/2004 Edsall et al. ............... 370/389
6,912,592 B2 * 6/2005 Yip ........................... 709/249
6,947,384 B2 * 9/2005 Bare ......................... 370/235
7,397,811 B2 * 7/2008 Green ....................... 370/432
7,558,273 B1 * 7/2009 Grosser et al. .......... 370/395.53
2003/0074466 A1 * 4/2003 Hughes et al. ............. 709/238
2005/0141537 A1 * 6/2005 Kumar et al. .............. 370/429
2006/0062187 A1 * 3/2006 Rune ........................ 370/338

OTHER PUBLICATIONS

Carter, Earl, Capturing Network Traffic for the Catalyst 6000 IDS Module, Feb. 15, 2002, Cisco Press, pp. 1-4.

* cited by examiner

Primary Examiner—Ayaz R Sheikh
Assistant Examiner—Chuong T Ho
(74) Attorney, Agent, or Firm—Cesari and McKenna, LLP

(57) ABSTRACT

A PVLAN having a primary and secondary VLAN's where the primary and secondary VLAN's have ports and the users connected to those ports. The MAC addresses of those users are learned in the primary or the secondary VLAN's and together with the port designation are stored preferably in tables associated with the VLAN's and the associated VLAN's. Processes are provided that replicate the tables in the other VLAN's so that the information necessary to transfer packets between source and destination ports is available to the associated VLAN's.

13 Claims, 5 Drawing Sheets

PLATFORM INDEPENDENT IMPLEMENTATION OF PRIVATE VLANS

BACKGROUND OF THE INVENTION

1. Field of the Invention

Then present invention relates to virtual local area networks, VLAN's, and more particularly to private VLAN's or PVLAN's.

2. Background Information

Virtual local area networks (VLAN's) represents a broadcast domain, where a client can send frames to any other client in the same VLAN. However, this arrangement presents security issues where other clients can monitor the traffic in the VLAN. Private VLAN's (PVLAN's) were invented to address this security issue.

Several prior U.S. patents, discussed below, describe the environment of the present invention.

U.S. Pat. No. 5,394,402, issued on Feb. 28, 1995 to Ross ('402). This patent is hereby incorporated herein by reference. This patent discloses that physical ports of a particular switch may be associated with groups within the switch by creating a table associating the ports with a VLAN designation. The VLAN designation and associated switch ports may be used in headers to direct messages sent to or received from any ports assigned to the VLAN designation. A memory is provided to store these associations that are usually in the form of tables.

Typically, the switch is a computer with one or more CPU's, memory and input/output (I/O) cards. Each card may include a limited number of ports that couple the switch to the other network entities over various types of media, such as Ethernet, FDDI (Fiber Distributed Data Interface) or token ring connections. A last hop or edge switch (or router) sends and receives messages, typically frames, to and from end users (Clients) over a communication network, e.g. the Internet. The edge switch typically contains an operating system, a route information base (RIB), a forwarding information base (FIB) and a management information base (MIB), hereinafter collectively referred to as an "information base," that allows the switch to receive and forward messages regardless of the end user protocol.

U.S. Pat. No. 5,959,989 ('989) issued Sep. 28, 1999 and is commonly owned with the present invention and is hereby incorporated herein by reference. This patent describes an invention for multicast distribution in VLAN's. Port addresses are associated with VLAN designations and with MAC (Media Access Control) addresses that are then arranged in groups for distribution. MAC addresses are typically hardwired in network interface cards (NIC).

The above references further describe VLAN's where a port is configured in one VLAN only, and where a port in one VLAN does not send traffic to a port in another VLAN. The following discussion introduces PVLAN's, where a port receives and/or sends information via at least two different but related VLAN's.

U.S. Pat. No. 6,741,592 ('592), issued May 25, 2004 and is commonly owned with the present application. The '592 patent is hereby incorporated herein by reference. This patent describes PVLAN's as three related VLAN's defined within a layer 2 (L2) switch. The three VLAN's are defined as one primary, one isolated and/or multiple community VLAN's. The isolated and community VLAN's collectively are referred to herein as secondary VLAN's. PVLAN's introduce three related ports, defined, respectively, as promiscuous, isolated and community. The promiscuous ports are connected to layer 3 (L3) or layer 4 (L4) devices, for example, routers that may in turn connect to the Internet or administrative work station or common network servers, e.g. a Dynamic Host Configuration Protocol (DHCP) server. The isolated and community ports connect to individual users' computers or servers, etc. and carry traffic for those users.

A primary VLAN functionally connects the promiscuous ports with isolated or community ports. The primary VLAN receives packets from L3/L4 devices at the promiscuous ports and transfers the packets to the isolated or community ports. The packets travel only one way from the promiscuous ports to the ports in the secondary VLAN's.

An isolated VLAN is defined as a VLAN that functionally connects isolated ports to promiscuous ports. In an isolated VLAN the traffic is only one way—packets are received at an isolated port and travel only from that isolated port to a promiscuous port. Packets are not available to other isolated or community ports.

A community VLAN is defined as a VLAN that functionally connects community ports to promiscuous ports. In a community VLAN the traffic is only one way—packets are received at a community port and travel only from that community port to the promiscuous ports and to the other community ports on that community VLAN. Packets do not travel from a community port to isolated ports, or to community ports on a different community VLAN that may exist on the same switch.

Assignment tables and/or Color Blocking Logic (CBL) logic circuits, found within L2 switches that support PVLAN's, are used in known embodiments of the logic operations, described above, in a PVLAN among the promiscuous, isolated and community ports and the primary, isolated and community VLAN's. Such tables and logic are referenced in the '592 patent and are known to those skilled in the art. But, such logic implementations are specific to particular hardware platforms.

A network security issue is discussed in an article entitled, "Capturing Network Traffic for the Catalyst 6000 IDS Module," issued by Cisco Press on Feb. 15, 2002. This article is hereby incorporated herein by reference.

The article describes VLAN access control lists (VACL's) for directing communication traffic flow to specific physical switch ports. The VACL's capture traffic in both directions— inbound and outbound from a port on the switch. The Catalyst 6000 IDS Module is a physical printed circuit interface card, and, as such, initialization of VACL's on the physical card requires creating/storing of the VACL's within a data structure (table) mapping the VACL's to specific VLAN's, and defining a VACL capturing port. The Catalyst 6000 IDS Module may have ports configured as Switched Port Analyzer (SPAN) ports that can direct traffic from ports to specific VLAN's or destination ports. However, in either case the physical configuration to implement these operations is intimately tied to the physical hardware and not easily transferred to other platforms.

When configuring a VLAN within an L2 switch using known techniques, an administrator will manually designate ports within the VLAN. However, when configuring PVLAN's, the administrator defines a primary and one or more secondary VLAN's but the MAC addresses associated with the corresponding ports are learned only in the primary VLAN. Learning MAC addresses associated with ports typically occurs dynamically as messages are received at the ports, using, for example, an address resolution protocol (ARP).

In an L2 switch configured to support PVLAN's, a forwarding engine operating with respect to a primary VLAN stores the MAC addresses and port numbers for the users connected to the ports. The MAC addresses of users that are also assigned to secondary VLAN's are not learned in that secondary VLAN. This alters the normal MAC address learning mechanism of typical VLAN's, requiring the PVLAN implementation to be closely tied to the hardware implementation. The above discussed CBL is implemented to effect the transfer of messages between proper ports via the restricted (isolated/community/primary traffic restrictions) and one-way traffic nature of a PVLAN.

Specifically, when a packet is received at an isolated or community port, the receiving port number is used to index into a table where the secondary VLAN designation is found. The packet is transferred to the forwarding engine for that secondary VLAN, and the destination port number from the packet is used to index another table defined for outgoing traffic from the primary VLAN. The L3/L4 destination address and promiscuous port number are retrieved from the table, and the packet is transferred to the forwarding engine associated with the primary VLAN that directs the packet to the proper L3/L4 device. As noted above, these known implementations are closely tied to the physical hardware in the L2 switch and not easily transferred to other platforms.

Typically, a user on a secondary VLAN is unaware of (cannot "see," is a term of art meaning that there is no reference available to that secondary VLAN) other users on another VLAN. So, a port on one secondary VLAN cannot send traffic directly to a port of the primary VLAN.

The present invention is directed to relieving to the above limitations and untying the PVLAN's from specific hardware platforms.

SUMMARY OF THE INVENTION

The present invention is directed to a method and apparatus that learns information of devices connected to the port in a primary or secondary VLAN associated with a PVLAN. MAC addresses may be learned in either a primary VLAN or in a secondary VLAN but such information is made available, preferably by replication, in the secondary or primary VLAN where the learning did not occur. Here the information learned includes port number and MAC address, but other useful information (depending on the application) may be learned in the PVLAN.

MAC addresses are learned in VLAN's configured in L2 switches, as known in the art, but the replication of the MAC addresses in both the primary and secondary VLAN's has the advantage of the PVLAN being implemented on generic L2 switches without any assumptions on the hardware platform. Address resolution protocol messages are received at a switch port designated in a VLAN. The switch creates an information base (for example a table, a linked list, stack or other storage structure) containing the MAC address sending the message, the receiving port number, and the associated VLAN designations. Such MAC addresses may be learned in either the primary or the secondary VLAN's, and the present invention makes the information available, by, in a preferred embodiment, replicating the information in the corresponding VLAN's in the PVLAN.

The present invention provides a system where a receiving packet is directed to a destination port that may belong to another VLAN within the PVLAN. The present invention also provides a system whereby if the sender and the receiver are in the same isolated VLAN, then communication is blocked for security reasons.

In another preferred embodiment, the information may be placed or stored in one location but accessible to all the VLAN's within a PVLAN.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
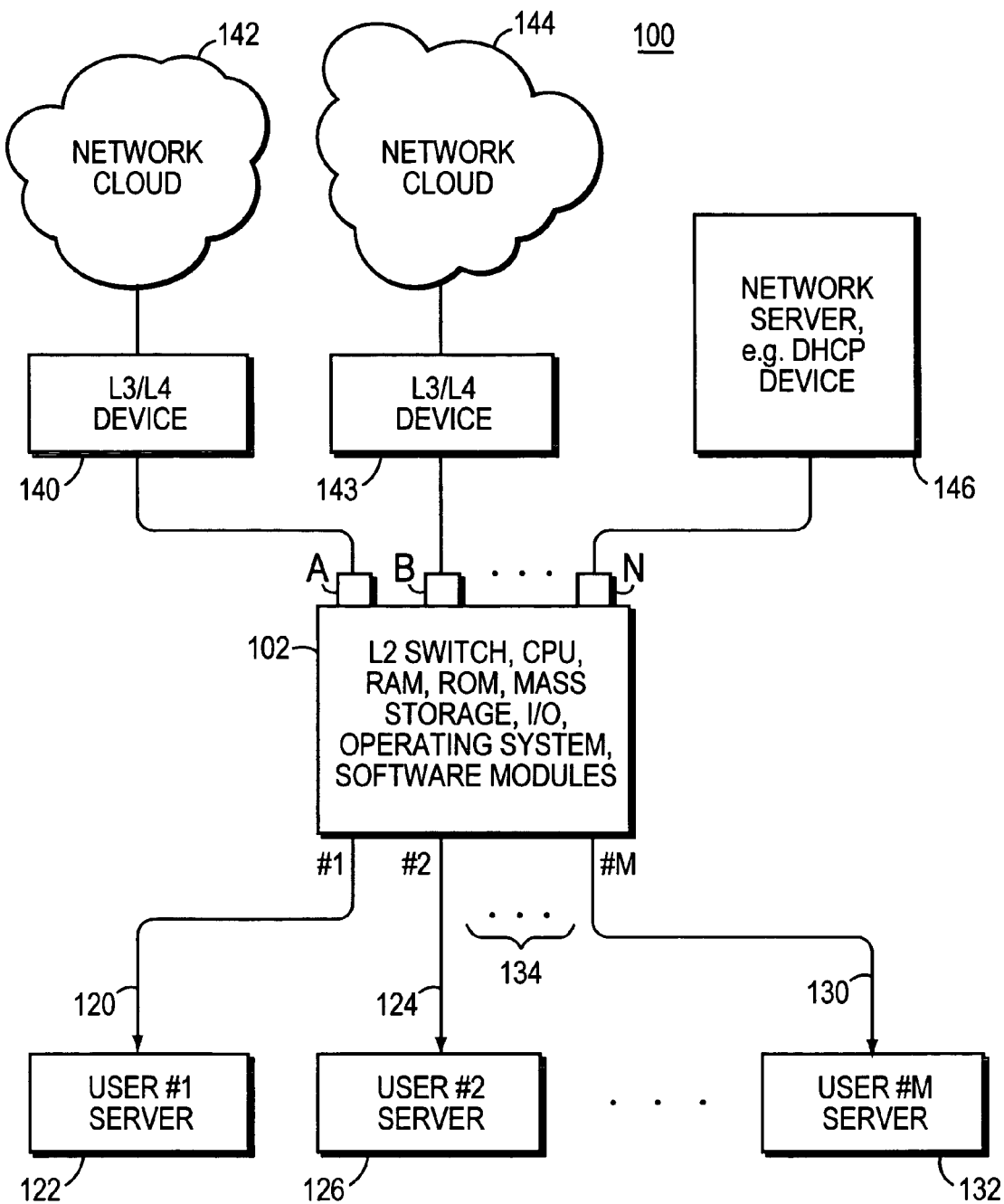
FIG. 1 is a schematic block diagram of an L2 switch connecting L3/L4 devices to user servers.

FIG. 1 is a general schematic/block diagram of a private VLAN (PVLAN) network. Here the layer 2 switch includes a CPU, related RAM, ROM and mass storage memory and I/O capabilities along with operational software. The switch may be implemented in combinations of hardware (ASIC's), firmware and software as applications suggest.

As discussed above, a private VLAN (PVLAN) network may be built within a L2 switch 102 where promiscuous ports, isolated ports and community ports are defined. These ports taken together are configured to define a primary VLAN and secondary VLAN's. A primary VLAN carries messages in one direction only from promiscuous ports to isolated or community ports. An isolated VLAN carries messages in one direction only from isolated ports to promiscuous ports, and a community VLAN caries messages in one direction only from community ports to promiscuous ports and to other community ports on the same community VLAN. Isolated VLAN's and/or community VLAN's are referenced herein as secondary VLAN's.

The L2 switch 102 has promiscuous ports, A, B, and others up to N, where "N" is an arbitrary number. In addition, the L2 switch 102 has community or isolated ports #1, #2 up to #M, where M is an arbitrary number. These ports are designated, by the system administrator, as isolated or community ports. The isolated/community ports connect to end users' servers 122, 126 up to 132, as shown.

The promiscuous ports A, B, . . . N connect to layer 3 or layer 4 devices 140,143,146. Examples of layer 3 or layer 4 devices are routers, common network servers, like DHCP servers, work stations, back-up network devices, etc. An administrative work station is a work station where a network administrator may view all, or at least many, of the details and occurrences on the network. Typically the administrator configures the promiscuous, community and isolated ports into the primary and secondary VLAN's. In this example, promiscuous Port A connects to layer 3 or layer 4 device (L3/L4 device) 140 that functionally connects to network cloud 142.

Promiscuous ports B connects to device 143 that functionally connects to the network cloud 144. Device 146 is a representative network server—a DHCP device that is functionally connected to promiscuous port N.

Network clouds 142, 144 may be different network clouds, for example each may comprise a backup device for a particular user server. Alternatively, each network cloud 142, 144 may represent the worldwide Internet. Further, each network cloud may represent one or several particular devices, and may also represent the worldwide Internet, etc.

Figure 2:
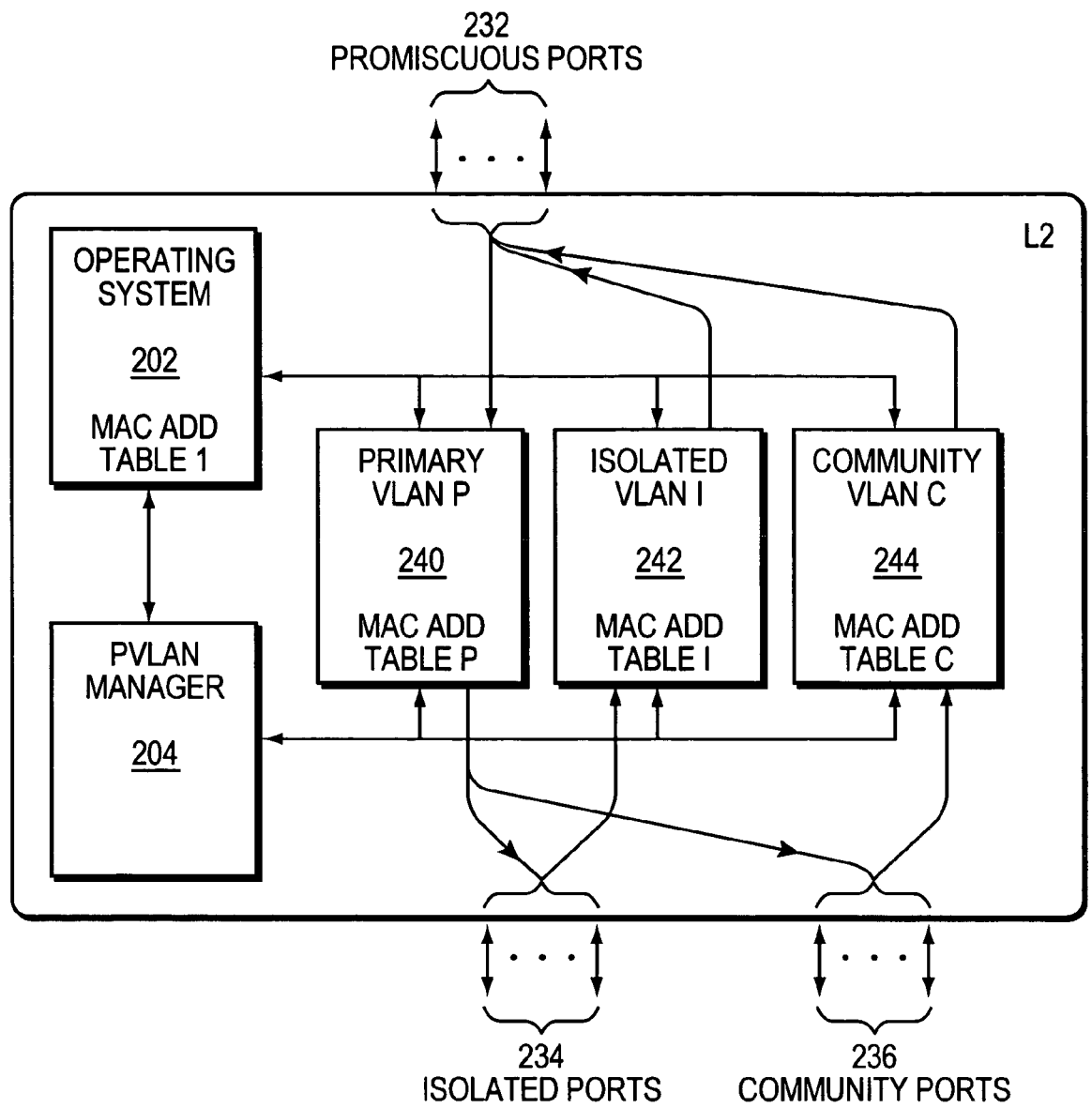
FIG. 2 is block diagram schematic of the contents of a switch illustrating a primary, an isolated, and several community VLAN's that comprise a PVLAN.

FIG. 2 is a block/schematic diagram of the interior of the L2 switch configured in accordance with the present invention. The L2 switch has an operating system 202 that monitors and controls, inter alia, the operation of the switch and, with a PVLAN manager 204, the PVLAN operation of the switch. A MAC address table (MAC ADD TABLE 1) resides in the operating system. This table contains the MAC addresses associated with all the ports and VLAN modules that comprise a PVLAN. The VLAN modules include a primary VLAN module 240, an isolated VLAN module 242 and a community VLAN module 244. There are MAC address tables, MAC ADD tables P, I and C, arranged in hardware memories, one in each VLAN module, that function as forwarding tables primarily controlled by the PVLAN manager 204.

The operating system, PVLAN manager and VLAN modules are generally software operating with hardware memories. But, these modules may be formed in software, firmware, and hardware and combination thereof.

With the PVLAN manager 204, the primary VLAN P module 240 carries out the primary VLAN operations, the VLAN I module 242 carries out the isolated VLAN operations, and the VLAN C module 244 carries out the community VLAN operations. Corresponding MAC ADD. TABLE's P, I and C contain the forwarding information base needed to transfer packets between ports, as described below.

In this example, the L2 switch has a series of ports that operate as promiscuous ports 232, a series of ports that operate as isolated ports 234, and a series of ports that operate as community ports 236. Not shown, the community ports may be formed into subgroups of community ports.

Figure 3:
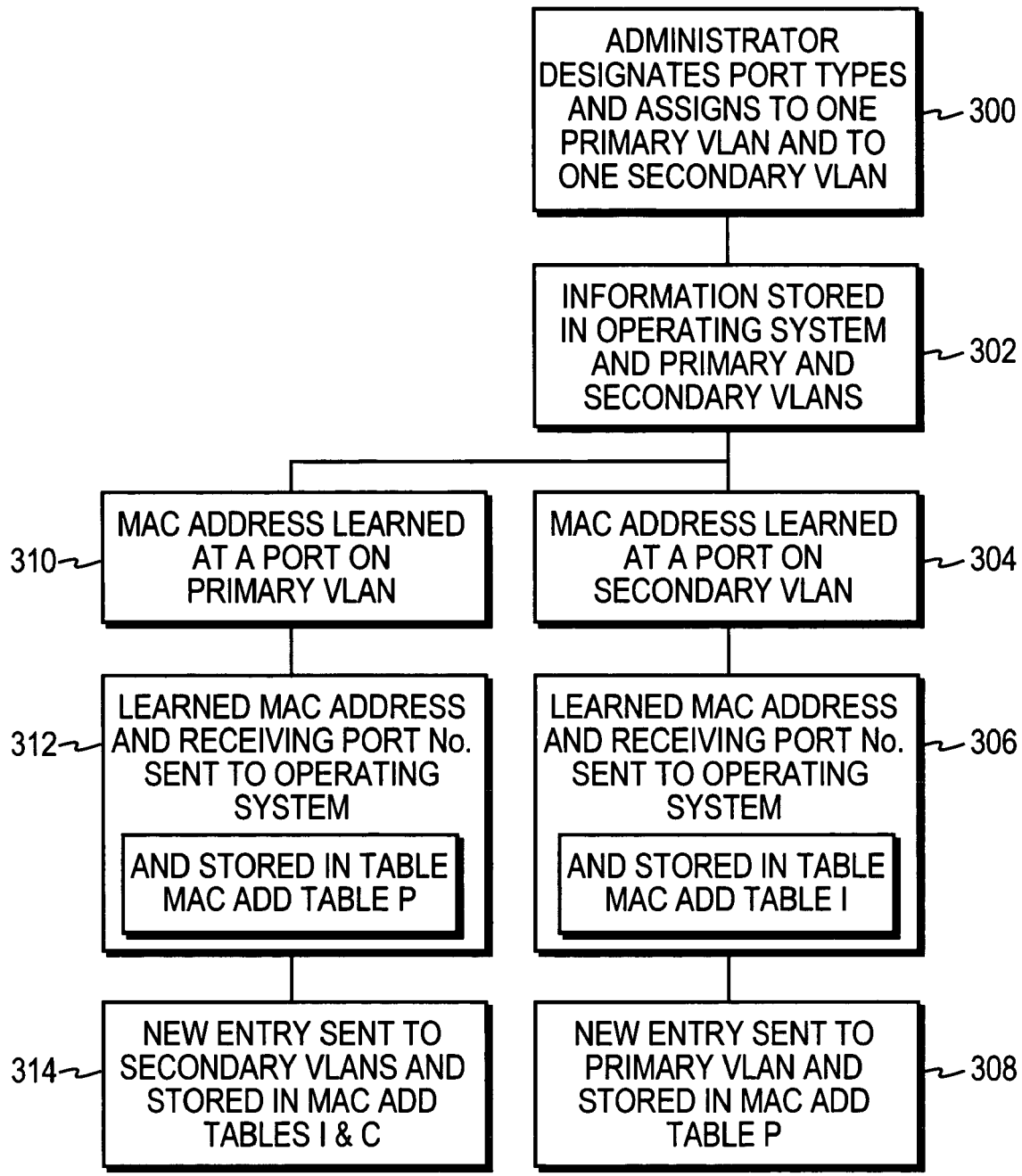
FIG. 3 is a representative flow chart of MAC address replication.

FIG. 3 illustrates one example embodying the invention for forming the forwarding MAC address tables. First, the administrator designates 300 the port types (promiscuous, isolated, community) and assigned them to the primary VLAN and to a corresponding secondary VLAN, either isolated or community. Note each isolated and community port is assigned to two VLAN's, and the promiscuous ports will be assigned to the primary and all the secondary VLAN's. This information is stored 302 in the operating system MAC ADD TABLE 1 and in the tables associated with the primary and the secondary VLAN'S.

A MAC address is learned 304 at a port in a secondary VLAN. As mentioned before, this may be accomplished via the known address resolution protocols (ARP). For example, if a user is connected to port 1 of a switch, and that port is assigned to secondary VLAN, then the MAC address, say MAC 1, of the user server is learned by receiving a message from that server. The learned MAC address and VLAN designations are transferred 306 to the operating system and stored in MAC ADD TABLE 1, and the new entry is replicated 308 in the primary VLAN by the PVLAN module.

In a similar manner all the ports and their connected client MAC addresses are learned and replicated in the tables associated with the primary and secondary VLAN's. For example, if the MAC address is learned a port on the primary VLAN 310, the learned MAC address and the receiving port number are sent to the operating system and stored in the MAC ADD TABLE P 312. The new entry is sent to secondary VLAN's and stored in the MAC ADD TABLES I and C 314.

Figure 4:
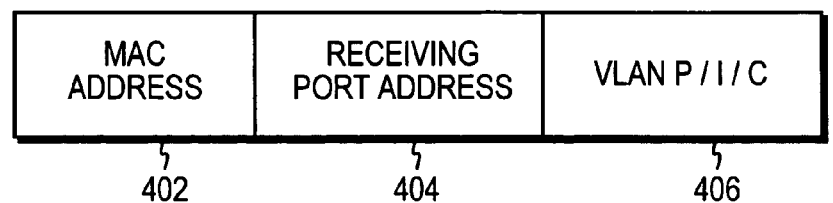
FIG. 4 is a representative entry into the table structure suitable for use with embodiments of the present invention.

With respect to a particular port in the PVLAN, FIG. 4 illustrates the contents in the MAC ADD TABLE 1 in the operating system 202, and MAC ADD TABLE P in the primary VLAN 240 and in MAC ADD TABLE I or C in the secondary VLAN 242 or 244. In FIG. 4, item 402 is the MAC address of the user on a secondary VLAN port, and item 404 is the port address and item 406 is the VLAN designation of either the primary or secondary VLAN.

Regardless of where or how information of a port in a secondary VLAN is determined, the present invention provides for the L2 switch's software to replicate the learned information, preferably, in a table within the operating system and in the primary VLAN. Similarly, address learned in the primary VLAN are replicated in the secondary VLAN's. In such a manner all the users on all the ports of the primary and all the secondary VLAN's are referenced within the corresponding secondary and primary VLAN's and in the operating system.

As mentioned above, prior PVLAN implementations are tied closely to specific platforms where dynamic learning of addresses of devices connected to ports occurs only in the primary VLAN's. In the present invention, these limitations are overcome by using any generic L2 switch configured to implement a PVLAN in accordance with the present invention. In particular, some L2 switch implementations use the Spanning Tree Protocol (STP) that prevents traffic flow between ports of different VLAN's, but the present invention provides an L2 switch that allows traffic from secondary VLAN ports to pass through primary VLAN ports, and visa-versa. This is so because the ports are configured in both VLAN's and the MAC addresses learned are replicated in the other corresponding VLAN's. However, it is necessary that the ports in the two VLAN's be in synch. For example, if the port in the primary VLAN is in the forwarding state, the state of that port in the secondary VLAN must also be in the forwarding state. That is the state of these ports must be updated to be consistent in both VLAN's.

Figure 5:
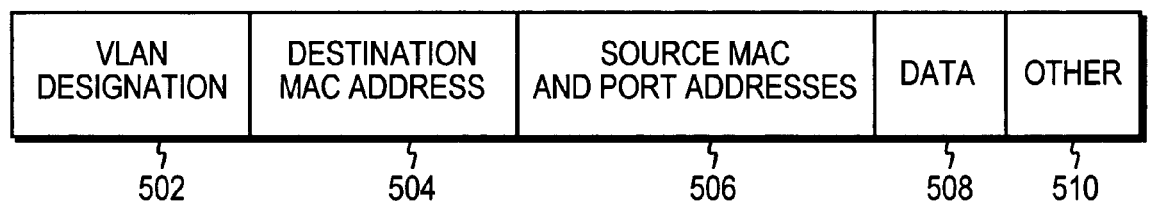
FIG. 5 is a representative packet format corresponding to the present invention.

FIG. 5 is a generic packet format within the L2 switch. The VLAN designation 502 is in concert with the port designations (promiscuous, isolated, or community) that received the packet. The MAC address 504 of the destination, the source MAC address and port address 506, the data being transferred 510, and other fields 512 in the underlying packet (checksum/CRC, etc.) follow. It is understood that many other packet organizations may be used within the context of the present invention.

Figure 6:
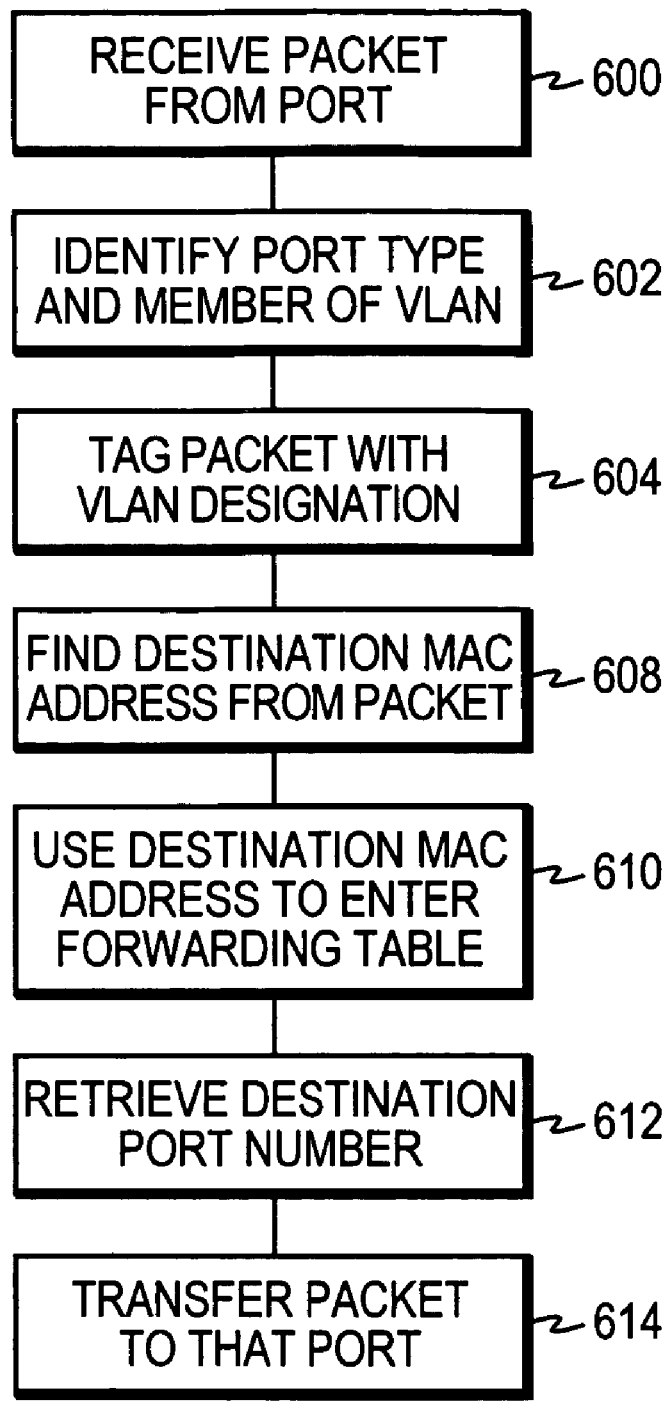
FIG. 6 is a flow chart of the flow of a packet within a PVLAN using an embodiment of the present invention.

FIG. 6 illustrates a flow chart of the traffic flow of a particular packet within a switch configured in accordance with the present invention. A packet is received 600 at a port that is identified to port type and associated with a VLAN 602. The packet is tagged with the VLAN 604, and is handled by the corresponding VLAN module in concert with the PVLAN manager. The destination MAC address is found from the packet 608, and the used to index into forwarding table (MAC ADD TABLE) 610. Although the destination MAC address may be in another VLAN within the PVLAN, the replication technique discussed in this invention makes the destination MAC address present in the above referenced forwarding table. The associated destination port number is retrieved 612, and packet is transferred 614 to that port for delivery. The VLAN's and the PVLAN manager carry out the PVLAN protocol needed for delivering the packet. In this illustration, the logic ensuring the transfer of packets according to the PVLAN is still in effect. The specific VLAN's will still operate, as described, to allow only the limited one way traffic characteristic of PVLAN's. Note, the VLAN designation attached to the packet is functional only within the VLAN, so any such designation is removed once the packet exits the VLAN.

Packets received by at an isolated port 234 (FIG. 2) are tagged with the isolated VLAN designation, VLAN I, and functional control of the packets is transferred to the PVLAN manager and the VLAN I module. The destination MAC address is retrieved from the packet itself. That destination MAC address is used to index into MAC ADD TABLE I to find and deliver the packet to the destination promiscuous port. Again the transfer is one way only from the isolated port to the promiscuous port.

Packets received at a promiscuous port 232 (FIG. 2) are tagged with the promiscuous VLAN designation, VLAN P, and functional control of the packets is transferred to the PVLAN manager and the VLAN P module. The destination MAC address is retrieved from the packet itself. That destination MAC address is used to index into MAC ADD TABLE P to find and deliver the packet to the destination isolated or community port. Again the transfer is one way only from the promiscuous port to the isolated or community port.

Packets that received at a community port are tagged VLANC1. Functional control of the packets is transferred to the PVLAN manager and the VLANC1 module. The destination MAC address is retrieved from the packet itself. That destination MAC address is used to index into the associated MAC ADD TABLE C to find and deliver the packet to the destination promiscuous port. The PVLAN manager also delivers the packet to any other community port designated as part of the same community VLAN. Community ports may be arranged as multiple sub-groups of community ports where packets are shared among those community ports in a sub-group. In such an instance the tagging will incorporate a particular sub-group. For example, if the sub-groups were designated A, B, and C, the tags would then read VLANCA1 for sub-group A, VLANCB1 for sub-group B and VLANCC1 for sub-group C. Other tagging arrangements will be known to those skilled in the art.

As known to those skilled in the art and as mentioned above, other data storage structures, including one table, linked lists, stacks may be used to advantage in some applications, and further the information may be included in logic modules without a formal table or data structure being developed. These and other such techniques will be known to those skilled in the art.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A method comprising:
designating a first port of a device as a promiscuous port and a second port of the device as either an isolated or community port, the promiscuous port to receive packets and transfer the packets to the isolated or community port using a primary VLAN that functionally connects the promiscuous port with the isolated or community port, the isolated or community port to receive packets and to transfer packets to the promiscuous port using an isolated VLAN that functionally connects the isolated port to the promiscuous port or a community VLAN that functionally connects the community port to the promiscuous port;

learning a media access control (MAC) address at the promiscuous port and storing the learned MAC address in a first table of a primary VLAN module of the device, the primary VLAN module associated with the primary VLAN; and replicating the MAC address from the first table to a second table of a secondary VLAN module of the device, the secondary VLAN module associated with the isolated VLAN or the community VLAN, to effectively replicate the MAC address from the primary VLAN into an isolated VLAN or community VLAN in which learning of the MAC address did not previously occur.

2. The method of claim 1 further comprising:
learning a MAC address at the isolated or community port and storing the learned MAC address in the second table of the secondary VLAN module of the device, the secondary VLAN module associated with the isolated VLAN or the community VLAN; and replicating the MAC address to the first table of the primary VLAN module, the primary VLAN module associated with the primary VLAN, to effectively replicate the MAC address from the isolated or community VLAN into a primary VLAN in which learning of the MAC address did not previously occur.

3. The method of claim 1 further comprising:
storing the learned MAC address in a third table maintained by an operating system of the device.

4. The method of claim 1 wherein the learning a MAC address at the promiscuous port further comprises:
determining the MAC address using an address resolution protocol (ARP).

5. The method of claim 1 further comprising:
receiving a packet at the isolated or community port of the device;
retrieving a destination MAC address for the received packet by accessing the replicated MAC address in the second table; and
transferring the received packet to toward a destination using the retrieved destination MAC address.

6. The method of claim 1 wherein the device is a layer 2 (L2) switch.

7. An apparatus comprising:
a first port designated as a promiscuous port and configured to receive packets and transfer the packets to an isolated or community port using a primary VLAN that functionally connects the promiscuous port with the isolated or community port;
a second port designated as the isolated or community port and configured to receive packets and transfer the packets to the first port using an isolated VLAN or a community VLAN that functionally connects the second port to the first port;
a processor; and
a memory configured to store a plurality of software modules for execution by the processor, the software modules including:
a primary VLAN module associated with the primary VLAN and configured to learn a media access control (MAC) address from the first port and store the learned MAC address in a first table associated with the primary VLAN module,
a secondary VLAN module associated with the isolated VLAN or the community VLAN and having an associated second table, and
a manager module configured to replicate the MAC address from the first table associated with the primary VLAN module to the second table associated with the secondary VLAN module, to effectively replicate the MAC address from the primary VLAN into an isolated VLAN or community VLAN in which learning of the MAC address did not previously occur.

8. The apparatus of claim 7 wherein the manager module is further configured to learn a MAC address at the second port and store the learned MAC address in the second table associated with the secondary VLAN module and replicate the MAC address to the first table associated with the primary VLAN module, to effectively replicate the MAC address from the isolated or community VLAN into a primary VLAN in which learning of the MAC address did not previously occur.

9. The apparatus of claim 7 further comprising:
an operating system maintaining a third table in which the learned MAC address is also stored.

10. The apparatus of claim 7 wherein the primary VLAN module is configured to learn the MAC address from the first port using an address resolution protocol (ARP).

11. The apparatus of claim 7 wherein the apparatus is a layer 2 (L2) switch.

12. An apparatus comprising:
a first port designated as a promiscuous port and configured to receive packets and transfer the packets to an isolated or community port using a primary VLAN that functionally connects the promiscuous port with the isolated or community port;
a second port designated as the isolated or community port and configured to receive packets and transfer the packets to the first port using an isolated VLAN or a community VLAN that functionally connects the second port to the first port;
means for learning a media access control (MAC) address at the first port and storing the learned MAC address in a first table of a primary VLAN module of a device, the primary VLAN module associated with the primary VLAN; and
means for replicating the MAC address from the first table to a second table of a secondary VLAN module of the device, the secondary VLAN module associated with the isolated VLAN or the community VLAN, to effectively replicate the MAC address from the primary VLAN into an isolated VLAN or community VLAN in which learning of the MAC address did not previously occur.

13. The apparatus of claim 12 further comprising:
means for learning a MAC address at the second port and storing the learned MAC address in the second table of the secondary VLAN module of the device, the secondary VLAN module associated with the isolated VLAN or the community VLAN; and
means for replicating the MAC address to the first table of the primary VLAN module, the primary VLAN module associated with the primary VLAN, to effectively replicate the MAC address from the isolated or community VLAN into a primary VLAN in which learning of the MAC address did not previously occur.

* * * * *